Sept. 13, 1938.　　　　P. B. BUCKY　　　　2,130,064
PROCESS OF AND MACHINE FOR CRUSHING AND MIXING
Filed Aug. 8, 1933　　　2 Sheets-Sheet 1

INVENTOR
Philip B. Bucky
BY
ATTORNEY

Sept. 13, 1938. P. B. BUCKY 2,130,064
PROCESS OF AND MACHINE FOR CRUSHING AND MIXING
Filed Aug. 8, 1933 2 Sheets-Sheet 2

INVENTOR
Philip B. Bucky
BY
ATTORNEY

Patented Sept. 13, 1938

2,130,064

UNITED STATES PATENT OFFICE 2,130,064

PROCESS OF AND MACHINE FOR CRUSHING AND MIXING

Philip B. Bucky, Mamaroneck, N. Y., assignor to University Patents, Inc., New York, N. Y., a corporation of New York Application August 8, 1933, Serial No. 684,141

16 Claims. (Cl. 83—46)

My invention relates to a process of crushing divers materials and to a machine for carrying out such process and refers more particularly to such processes and machines of the centrifugal type.

Among the desirable objects of my invention are a wide range of control and regulation of the process, both as to the desired degree of fineness or comminution and also with regard to the nature of the different materials to be crushed, or pulverized. Another object is to effect the desired operation expeditiously.

Other objects of my invention are a compactly constructed machine of large capacity for its size, capable of operation at high speed, not subject to much wear, capable of extensive regulation in a variety of ways depending upon the ultimate results desired or the nature of the material fed to the machine, including the regulation and control of the amount of impact, abrasion and pressure to which the material is subjected.

Another object of my invention is to provide a process and a machine capable of varied and extensive industrial applications, for example, in plants for producing pulverized fuel, such as coal, including adaptation to domestic use in conjunction with a burner for powdered fuel; in the cement industry; in the mining industry; to crush, comminute, or pulverize, stone or other materials for any purpose; for mixing different materials together, either with or without crushing; for carrying out the process and operation either in accordance with the dry system or by the wet system, with the use of a flow of or circulation of liquid, such as water, through the machine; the use of balls or similar supplemental disintegrating elements, or not, according to the nature of the material or the results desired to be produced.

Other desirable attributes of my invention will hereinafter appear.

In carrying out the process of my invention, fragmentary material is reduced to the desired degree of fineness by subjecting such material repeatedly an indefinite required number of times, alternately to centrifugally-produced crushing pressure, together with concomitant abrasion, and to centrifugally-produced crushing impact which is brought about by causing impingement of the material to arrest its momentum after such material has been released from restraint.

More particularly, in accordance with my invention, the fragmentary material is caused to travel in a closed circuit, where it is subjected to centrifugal force at a plurality of separate places arranged in series relation along the circuit, is released from restraint for free tangential movement following each such application thereto of centrifugal force, and following each such release while the material is thus tangentially moving it is subjected to impact by impingement, which arrests its momentum.

A machine for carrying out the ideas of my invention may comprise an annularly flaring outer centrifugal element, means being provided for feeding the original material into the smaller end of this element, an impact ring or annular member against which the material is thrown or impelled into impingement from the larger end of this centrifugal element and from which such material is deflected and may escape, means for transferring such escaped material into the smaller end of an annularly flaring inner centrifugal element which telescopes at its larger end into the larger end portion of the outer centrifugal element, this inner centrifugal element throwing or impelling the material from its larger end into impingement against the material within the outer centrifugal element, these centrifugal elements being coaxially mounted.

More particularly, in such a machine, the common axis of the centrifugal elements may be horizontal, and a bucket wheel mounted to rotate on the same axis may collect the impinged material escaping from the impact ring and drop this material into an inner hopper which opens into the smaller end of the inner centrifugal element. The impact ring desirably has a revolving movement and may be in the form of a flange on the bucket wheel and may be inclined or flared towards the bucket wheel so as to deflect the impinged material more readily into the bucket wheel. A stationary collecting chamber for the finer particles may be provided at the other side of the bucket wheel in communication therewith and may desirably be of annular form with an outlet provided from its lower portion.

The two centrifugal drum elements and the bucket wheel are all mounted so as to be capable of being rotated independently of one another. The centrifugal elements may thus be concomitantly but independently rotated in either direction individually, and similarly at any desired independent speed, as determined by the nature of the material and the result which it is desired to produce. This of course includes the rotation of the outer centrifugal element either in the same direction or in an opposite direction relatively to the direction of rotation, or revolving movement of the impact-producing ring.

The smaller particles of material, of the desired size, may be withdrawn or carried out of the machine by means of a draft of air which may be produced by suction at the outlet, the force of this draft being regulated so as to be whatever may be desired under any particular circumstances. With wet operation, the smaller particles may be similarly carried out of the machine by means of a current of water. While the machine is designed to operate with a continuous feed intake together with a continuous output discharge, any batch of material may be retained therein as long as desired, merely by discontinuing both the feeding of material to the machine at its intake and the withdrawal or removal of material through its outlet. When balls or the like are also employed, they of course remain in the machine, by reason of their size and weight. A feed hopper at the intake may convey the original material into the smaller end of the outer centrifugal drum element.

The centrifugal crushing machine of my invention also includes various features of construction and combinations of parts, as will appear from the following description and the appended claims.

For further description, reference will now be had to the accompanying drawings, illustrating a practical embodiment of my invention, similar parts being designated by similar reference numerals, and in which:—

Figure 1:
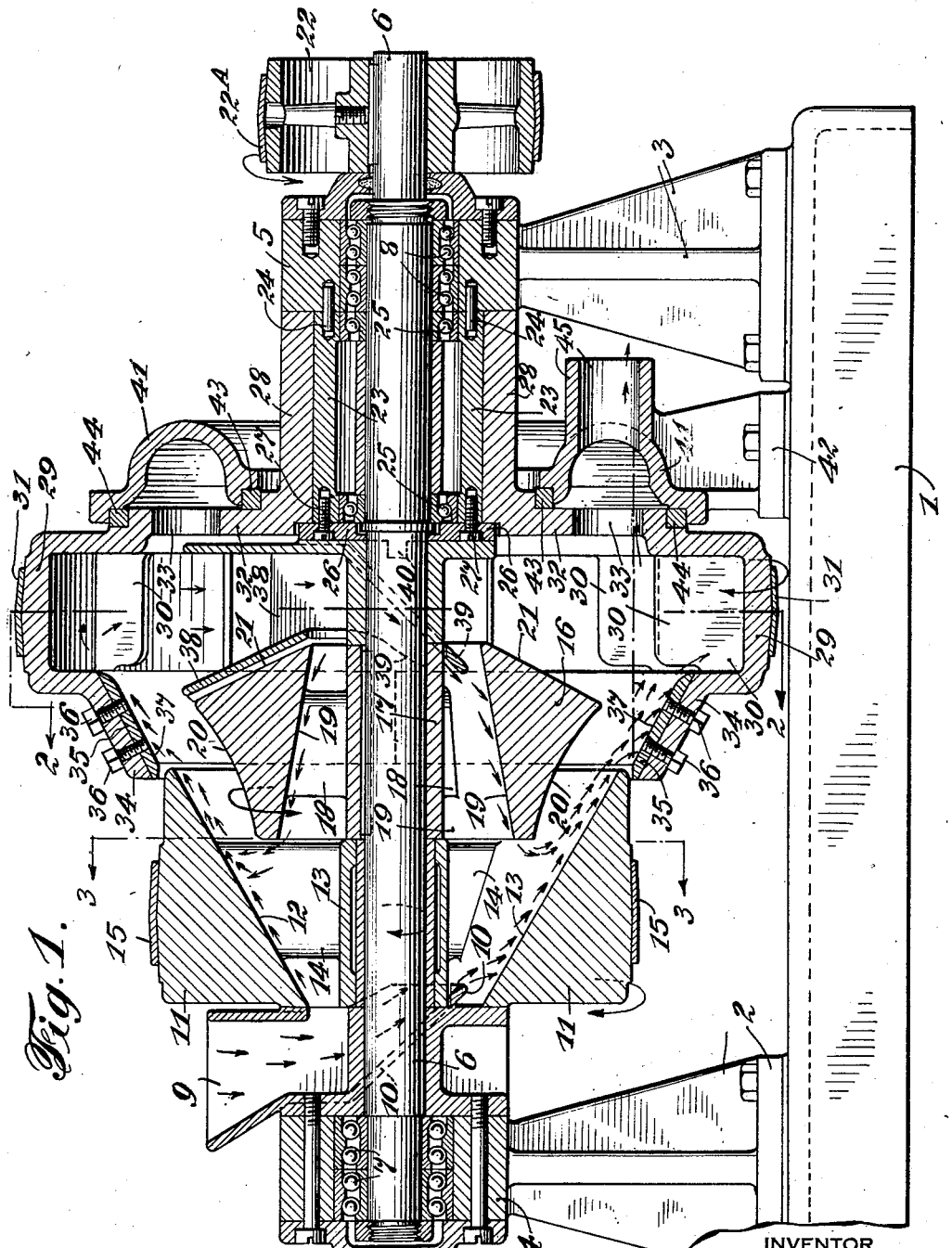
Figure 1 is a central vertical longitudinal section of a centrifugal crushing machine embodying my invention.

The size of the machine of course may be varied, for increased output, and for accommodating it to the handling of materials which are originally, i. e., as fed to the machine, in larger or smaller sized chunks or fragments. In any case, the machine of my invention has a large output relatively to its size. In order to give a clearer idea of its relatively small size and compactness together with the large volume of output of which it is capable, it may be noted that the actual full size in over-all dimensions of the machine shown in the drawings are substantially 32½ inches in total length, about 23 inches in height, and approximately 19½ inches in width, i. e., only slightly more than three times the size shown in the original patent drawings.

The practically workable exemplification of the centrifugal crushing machine of my invention illustrated in the accompanying drawings will now be particularly described as to its construction and manner of operation.

A base 1 has end pedestals 2 and 3 terminating in bearing heads 4 and 5, and a rotatable horizontal shaft 6 is journaled in these heads by means of anti-friction bearings 7 and 8. Intake of material to the machine is provided by a feed hopper 9 which includes a double-flanged sleeve portion surrounding the shaft 6 and bolted to the bearing head 4, this hopper opening into the adjacent end of the machine around the shaft 6, where it is provided with an inclined chute or spout 10.

A rotatable outer centrifugal drum element 11, which is open at both ends, has an inwardly flaring inner surface 12 which is shown as conical with its smaller end immediately adjacent to and in substantially sealed relation with the feed hopper 9. This centrifugal element has a hub 13 by means of which it is supported for rotation upon and relatively to the shaft 6, this hub extending out to the adjacent flange of the feed hopper 9, with the end of the feed hopper spout 10 shown as projecting slightly into the annular opening at this end of the centrifugal element. This centrifugal element 11 has a plurality, shown as three in number, of radial spokes 14, 14 which are of elliptic shape and rather wide in the direction of the length of the shaft 6. This outer centrifugal drum element 11 has its periphery or rim shaped to form a pulley so that it may be individually rotated by means of a drive belt 15.

An inner rotatable centrifugal drum element 16, open at both of its ends, has a hub 17 by means of which it is supported and fixed upon the shaft 6 to rotate therewith. It has a plurality of, shown as three, radial spokes 18, 18, which are elliptic so as to be wide in the direction of the length of the shaft 6. This inner centrifugal element 16 has an inner flaring surface 19 which is shown as conical with its larger end directed towards the outer centrifugal element 11, into which the inner centrifugal element 16 telescopes to the extent of a lesser or minor portion of the axial length of each of these two centrifugal elements. The amount of flare of the inner surface 19 of the inner centrifugal element 16 is shown as somewhat less than that of the inner surface 12 of the outer centrifugal element 11, in each instance the angle of flare being shown as substantially less than forty-five degrees relatively to the axis of rotation.

The peripheral surface 20 of the inner centrifugal element 16 tapers towards and into the larger open end of the outer centrifugal element 11, and is shown as thus somewhat gradually tapering along slightly concavely curved lines. The smaller end portion of this exterior or peripheral tapering surface 20 is spaced from the larger end portion of the inner flaring surface 12 of the outer centrifugal element 11, so as thus to form an annular passageway between these spaced surfaces of the respective centrifugal elements.

The inner centrifugal element 16, beyond the adjacent end of the outer centrifugal element 11, is provided with a beveled end surface 21 between the smaller end of its inner conical surface 19 and the larger end of its tapered peripheral surface 20, in order to provide clearance, for a purpose which will presently appear. This inner centrifugal drum element 16 may be individually rotated, independently of the outer centrifugal drum element 11, by means of a pulley wheel 22 fixed upon one end of the shaft 6 and shown as adjacently outward from the bearing head 5, and this pulley 22 may be rotated by means of a drive belt 22A.

The bearing head 5 at its inner side is provided with a sleeve-like extension 23 secured thereto and shown as anchored in place by means of dowel pins 24, 24. The shaft 6 is further journaled within the ends of this extension sleeve by means of anti-friction bearings 25, 25. The end of the sleeve 23 has an inwardly and outwardly extending annular flange plate 26 secured thereto by means of screws 27, 27.

The outwardly extending hub 28 of a bucket wheel or drum 29 is journaled on the sleeve extension 23 between the adjacent face of the bearing head 5 and the radially outer edge portion of the flange plate 26. The bucket wheel 29 forms an inwardly opening annular channel in which there is fixed a circular series of bucket-forming partition members 30, 30, and these buckets are adapted to empty out their contents while moving through an upper arc portion as the bucket wheel is rotated in the direction indicated by the arrows in Figures 1 and 2. The periphery of the bucket wheel 29 forms a pulley which provides for it being rotated by means of a drive belt 31, such rotation being individual and independent of the rotation of each of the centrifugal drum elements 11 and 16. The side of the bucket wheel 29 adjacent to its hub 28 is provided with a web 32 having through it a circular series of outlet holes 33, 33 just inward from the adjacent side wall of its annular bucket-containing channel.

The beveled end 21 of the inner centrifugal element 16, together with the smaller end of its inner flaring surface 19, extends part way into the central portion of the bucket wheel 29. This side wall of the annular channel of the bucket wheel 29 is shown as of less width than the other, with the bucket members 30, 30 extending inwardly beyond it. An annular flange 34 extends from the inner limit of this wall outwardly from the bucket wheel 29 towards the inner end of the outer centrifugal element 11, which is spaced from the bucket wheel, with this flange surrounding the outer peripheral portion of the inner centrifugal element 16, from which it is radially spaced to provide a passageway. This flange 34 is provided with a hard wear-resisting lining 35, which is conveniently formed in two pieces and is shown as removably and replaceably firmly secured in place by means of a suitable number of screw bolts 36, 36.

This bucket wheel flange 34 together with its lining 35 forms an impact ring which is a circularly moving annular impact member, receiving material which has been centrifugally ejected by the outer centrifugal element 11 and deflecting it into the bucket wheel 29. The lining 35 is of the full width of the flange 34, from the free edge of this flange to the annular channel of the bucket wheel 29. The inner impact surface 37 provided by the lining 35 flares from the outer centrifugal element 11 into the annular channel of the bucket wheel 29, such flare being shown as conical. The smaller edge portion of the lining 35 is beveled at the inside on cylindrical lines and freely telescopes for a relatively short distance, with some clearance, over the cylindrical periphery of the outer centrifugal element 11. The smaller end of the conically flaring impact surface 37 is stepped or offset radially outward beyond the larger end of the conically flaring inner surface 12 of the outer centrifugal element, which allows air to enter and decreases possibility of friction due to material imbedding itself between surfaces. Impact occurs here.

The impinged deflected material escaping from the flaring impact ring surface 37 into the bucket wheel 29 will of course remain in the lower portion of this wheel or drum to be carried upwardly thereby, while the material received in the upper portion of the bucket wheel, together with that carried upward thereby, will drop down. Such material emptied out by and dropping from the bucket members 30, 30, as well as also that received in a corresponding upper arc of the bucket wheel 29, will fall into an inner hopper 38, this hopper being for the most part within the bucket wheel, but having an arcuate wall extending along and in proximity to the beveled end surface 21 of the inner centrifugal element 16.

This hopper 38 opens into the smaller end of the flaring centrifugal surface 19 of the inner centrifugal element 16, towards and into which the bottom portion of the hopper is inclined and extends, so as to provide an inclined chute or spout 39. This inner hopper 38 is sleeved around the shaft 6 between the centrifugal element hub 17 and the flange plate 26, adjacent to which this hopper is flanged. The hopper 38 is held upright on the shaft 6 by means of a lug 40 on the flange ring 26 projecting into a recess in the hopper, 38, as indicated by broken lines in Figure 1, it being obvious that a plurality of such interengaging lugs 40 may be provided, such as another similar lug diametrically opposite to the lug 40 shown.

A stationary collector ring 41, forming an annular collecting chamber, has an open side communicating with the interior of the bucket wheel 29 through the outlet openings 33, 33 in its web 32. This channel-shaped collector ring 41 has a base portion 42 by means of which it is firmly supported and securely held in place on the frame base 1. Radially spaced sealing rings 43 and 44 are shown as interposed between the bucket wheel web 32 and the respective channel edge faces of the collecting chamber 41. At its lowermost portion the annular collecting channel 41 is provided with a tubular outlet nipple 45, from which any suitable conduit (not shown) may lead.

The operation is as follows:—

Figure 2:
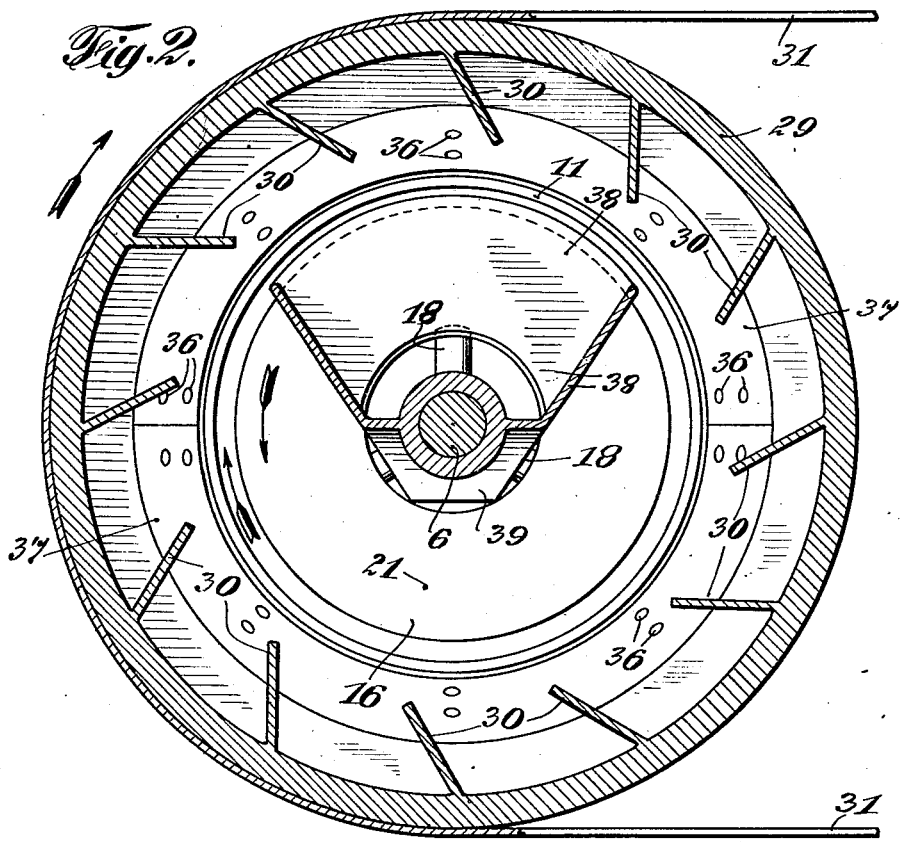
Figure 2 is a transverse vertical section on the line 2—2 of Figure 1.

The course of the material acted upon, through the machine, from the inlet hopper 9 ultimately to the outlet nipple 45, is indicated in general by means of the direction of flight of the numerous arrows shown in Figure 1. The material to be acted upon may be supplied to the feed hopper 9 by any suitable means (not shown). This supply of material may be continuous, if so desired, and the amount or rate of such supply is to be controlled or regulated as desired, being determined by all of the factors involved in the operation of the machine under any particular circumstances or conditions.

The material flowing by gravity from the feed hopper 9 into the smaller end of the flaring inner surface 12 of the first or outer rotating centrifugal element 11 is struck, with resulting impact, by the revolving material which has preceded it. Such material then begins to revolve with the centrifugal element 11 and is pressed towards the inclined surface 12 by centrifugal force, with a resulting tendency to crush it. As this material travels along the rotating surface 12 towards the larger end of the latter, the lineal speed of revolution of the material is accelerated while at the same time the centrifugal pressure to which it is subjected increases.

During this traveling movement of the material, it is also subjected to abrasion, due to the frictional grinding action among its relatively moving parts. With a sufficiently acute angle of the surface 12 relatively to its axis of rotation, for example, such as is shown in the drawings, the centrifugal force will build up a layer of material which will stay on this surface, thereby causing the moving material to travel upon this layer of material, so that thus wear on the surface 12 will be greatly reduced.

Figure 3:
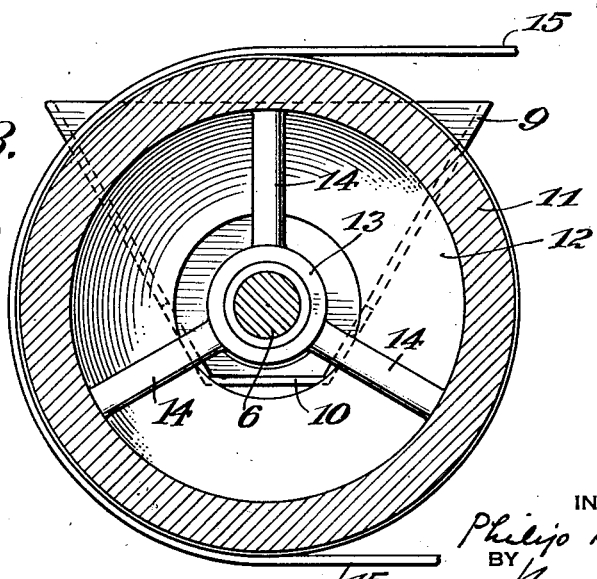
Figure 3 is a similar section on the line 3—3 of Figure 1.

The centrifugal element 11 may be rotated at any speed desired, depending on its diameter, capacity desired, nature of material, and the result which it is desired to produce. That is to say, the rotation of the centrifugal element 11 in some instances may be very gentle or slow while in other instances it may be very high or fast. For example, and perhaps most commonly, this speed of rotation, in the particular machine shown in the drawings, may be at the rate of substantially 2,000 R. P. M. Also this centrifugal element 11 may be rotated in either direction desired, such direction as indicated by arrows in the drawings being clockwise as viewed from the right in Figure 1 and as seen directly in Figures 2 and 3. While the direction of rotation of this centrifugal element 11 does not affect its action per se, it does affect the results produced in relation to other parts of the machine, as will presently clearly appear.

The material thrown centrifugally, in an annular freely moving stream, from the larger end of the flaring surface 12 of the rotating centrifugal element 11 impinges with crushing impact against the annular surface 37. The amount of this impact may be controlled and regulated within a wide range. It depends upon the relative speed of movement between the centrifugal element 11 and the moving impact ring 34. It not only depends upon the speed of rotation of the centrifugal element 11, but depends also upon the direction of such rotation as compared with the direction of rotation of the impact ring 34. Thus when the centrifugal element 11 is rotated oppositely to the rotation of the impact ring 34, the force of impinging impact will be correspondingly greater than when the movement is in the same direction, as indicated in the drawings.

The impinged material deflected by the impact surface 37 into the bucket wheel 29 drops therefrom and therein into the inner hopper 38 through which it passes by gravity into the smaller end of the flaring inner surface 19 of the second or inner rotating centrifugal element 16, this being more especially true of the larger fragments or coarser portions of the material. The action of this inner centrifugal element 16 upon the material is substantially similar to that of the outer centrifugal element 11. Such material is subjected to the impact of the revolving material immediately preceding it.

When this material has revolution imparted to it by the centrifugal element 16, it is subjected to the crushing pressure of centrifugal force, which gradually increases towards the larger open end of the conically flaring surface 19 together with the acceleration of the lineal speed of revolution of the material. The movement of the material relatively to itself also results in its abrasion. The acuteness of the angle of the surface 19 relatively to its axis of rotation is such, in the illustrated machine, as to cause the centrifugal force to build a layer of material on the surface 19, forming a lining of such material relatively to which the moving material travels, thus very much reducing the wear on this surface.

The inner centrifugal element 16 may be rotated inidividually or independently in either direction desired and in either case at any speed desired. So far as this centrifugal element acts per se, its direction of rotation is immaterial, but both its direction and speed of rotation may make a tremendous difference in action and results relatively to the direction and speed of rotation of the outer centrifugal element 11, as will soon be clearly seen. In the drawings, the direction of rotation of the inner centrifugal element 16 is indicated as being opposite to that of the outer centrifugal element 11. Under usual circumstances, the speed of rotation of the inner centrifugal element 16 may ordinarily be, for example, substantially at the rate of 3,000 R. P. M., with the particular machine shown in the drawings.

The material, especially as to its coarser portions and larger fragments, is centrifugally thrown from the larger end of the flaring surface 19 in an annular stream having a major component of tangential movement. This freely moving stream joins and impinges with greater or less force against the material already within and revolving, in one direction or the other, with the oppositely flaring surface 12 of the outer centrifugal element 11. The force of this impingement and consequent impact depends for the most part upon the relative speed of movement between the two centrifugal elements 11 and 16.

With these centrifugal elements running in opposite directions, as indicated in the drawings, there would be direct or head on collision of material moving in substantially opposite directions. At relatively high speeds the impact produced by such colliding impingement would be enormous. On the other hand, with both of these centrifugal elements running in the same direction and at approximately the same linear speed, the force of impact may be considered as negligible. Higher speeds of the centrifugal elements will impel the material through them at a faster rate, as well as increase the centrifugal crushing pressure and the abrasive action.

All of the material originally within the first or outer centrifugal element 11, supplemented by that received from the second or inner centrifugal element 16, now travels towards the larger end of the flaring surface 12 of the former, in the annular space or passageway between this flaring surface 12 and the similarly flaring peripheral surface 20 of the inner centrifugal element 16. With the centrifugal elements 11 and 16 running at different speeds, especially when running in opposite directions, it is evident that there will be much turbulence in this stream of material, with many collisions and bombardments taking place in it. This material, especially its larger fragments and coarser portions, is centrifugally thrown, in a freely moving annular stream, against the annular abutment surface 37, by which, following its impingement against this surface, it is deflected into the bucket wheel 29.

It will be noted that the portion of the material which was returned to the outer centrifugal element 11 by the inner centrifugal element 16 has now completed an endless circuit in the machine. The same material may thus be passed repeatedly through this closed circuit any required number of times, until it is reduced to the desired degree of fineness. It is also to be noted that all of the material passing through this circuit has been repeatedly subjected to crushing impact, alternating with its simultaneous subjection to crushing pressure along with abrasion.

Besides the above described closed circuit, the machine also has what, in contradistinction, may be denominated an open circuit. This open circuit for the passage of material extends through the machine from its intake at the outer feed hopper 9 to its outlet at the nipple 45, and this latter circuit may or may not include the closed circuit, either not all, or once, or a repeated number of times, since only the larger pieces or coarser portions of the material are subjected to repeated passage through the closed circuit.

In operating under dry conditions, all material which, anywhere in the machine, has reached the desired fineness will be separated out and withdrawn from the machine through the outlet nipple 45, by the draft of air through the machine created by suction through this nipple, produced by any suitable means (not shown). It will be noted that the annular channel-shaped collector 41 distributes the suction effect and applies it circumferentially around the machine through the openings 33 into the bucket wheel 29. The separation of finer from coarser materials by means of a current of air is of course in accordance with an operably correct principle of physics. This current or draft of separating air through the machine is controlled or regulated so as to be of the desired strength, as determined by the various factors involved in the operation under any particular circumstances, including the results desired to be produced by the machine.

For wet operation, a current of water may be flowed through the machine, which also will operate in accordance with a similar correct principle for effectively removing the finer material. There may desirably be a normal water level in the machine slightly but sufficiently above the bottom of the lowermost opening 33 and the bottom of outlet nipple 45 to provide for a free flow, as is indicated in Figure 1 of the drawings. Besides gravity, or in addition thereto, the flow of separating water through and out of the machine may be induced by any suitable means (not shown). The overflow, or other current, of water from the machine, carrying with it the finer material, in suspension or otherwise, may be readily separated out from the solid material by any suitable means (not shown), such as by means of a usual form of thickener.

In operating the machine, a suitable quantity of hard crushing and abrading bodies, such as hard metal balls, may be introduced into the machine, there to intermix with the material being acted upon and pass with it continuously through the above described closed circuit of the machine; this being done whenever operating conditions make it desirable, depending upon the nature of the material to be acted upon by the machine and the final results which may be desired, under any particular circumstances, while at other times such balls or the like may be omitted.

The size of the fragments or pieces of material fed to the machine is immaterial so long as such material will flow freely into the machine. Obviously the machine may be built in correspondingly larger sizes for acting upon material which has large pieces or lumps. In any case, the extent of reduction or pulverization may be controlled and regulated as desired.

In carrying out the process of my invention, the machine of my invention is similarly well adapted to act upon materials ranging from hard to soft, from materials offering great resistance to breaking to those easily broken, irrespective of the nature or other properties of the material.

In the machine shown in the drawings, materials, such as hard granite, can readily be reduced to a fine powder. Also more friable materials, such as coal, which may be buckwheat coal, or in larger sizes, can be easily and quickly reduced to dust coal, for example to a powder having its particles of about 200 screen-mesh size. Different kinds of material fed concurrently into the machine may be reduced and thoroughly mixed at the same time. Also the extent and character of regulation of operation provided for adapts the machine for use as a mixer alone. It will be noted that the machine of my invention is of simple construction and that it can be readily manufactured, from suitable metal.

It should now be evident that the process of my invention and the machine of my invention by means of which such process may be carried out have a wide field of utility in different industries for producing related but variable regulatable results in a practically effective manner with a high degree of efficiency.

It is obvious that various modifications may be made in the process and in the construction of the machine of my invention shown in the drawings and above particularly described, within the principle and scope of my invention as defined in the appended claims.

I do not limit myself unduly to specific details of procedure in the process nor of construction in the machine, nor to size, nor to specific proportions or relationship of parts, these being given simply as a means for clearly describing the process and machine of my invention.

What I claim is:—

1. A process of crushing material which comprises causing the material to be acted upon to travel in a closed circuit, subjecting such material to crushing pressure produced by centrifugal force at a plurality of separated places arranged in series relation in such closed circuit, releasing such material from restraint for free tangential movement following each such application thereto of centrifugal pressure and at a corresponding plurality of separated places in series relation along such closed circuit, and subjecting such released tangentially moving material to crushing impact produced by impingement at a corresponding plurality of separated places along such closed circuit.

2. A process of crushing material which comprises causing the material to be acted upon to travel in a closed circuit, subjecting such material to crushing pressure produced by centrifugal force at a plurality of separated places arranged in series relation in such closed circuit, releasing such material from restraint for free tangential movement following each such application thereto of centrifugal pressure and at a corresponding plurality of separated places in series relation along such closed circuit, subjecting such released tangentially moving material to crushing impact produced by impingement at a corresponding plurality of places along such closed circuit, removing from such closed circuit the finer portions of material which has been acted upon, and feeding fresh material to be acted upon into such closed circuit.

3. In a centrifugal crushing machine, in combination, an annular outer centrifugal element mounted to have a horizontal axis and having an inner annularly flaring surface adapted to carry material towards its larger end from which such material is centrifugally impelled in an annular stream, an annular inner centrifugal element coaxial with said outer centrifugal element and having an inner annularly flaring surface the larger end of which telescopically enters part way into the larger end portion of the inner flaring surface of said outer centrifugal element and adapted to carry material towards its larger end from which such material is centrifugally impelled into impingement with material carried by the inner flaring surface of said outer centrifugal element, an annular impact member coaxial with said centrifugal elements and having an inner impact surface outward from the larger end of the inner flaring surface of said outer centrifugal element and against which centrifugally impelled material from said outer centrifugal element impinges in an annular stream and from which such impinged material is deflected away from said outer centrifugal element, a bucket wheel coaxial with said centrifugal elements and which receives therein material deflected by said impact member, and a hopper within the bucket wheel adapted to receive material therefrom and direct it into the smaller end portion of the flaring inner surface of said inner centrifugal element.

4. In a centrifugal crushing machine, in combination, a horizontal rotatable shaft; an inner centrifugal element fixed upon said shaft to be rotated thereby, said element having a gradually flaring inner concentric surface and a peripheral surface tapering towards the larger end of its flaring surface and a beveled end surface between the smaller end of its flaring surface and the larger end of its tapering surface; means adapted to rotate said shaft in either direction desired at any speed desired; an outer centrifugal element mounted coaxially with said shaft to be independently rotatable relatively thereto, said outer element having a gradually flaring inner concentric surface the larger end portion of which is telescoped over and concentrically spaced from the smaller end portion of the tapering peripheral surface of said inner element; means adapted to rotate said outer element independently in either direction desired at any speed desired relatively to said inner element; a feed conduit for material to be acted upon opening into the smaller end portion of the flaring surface of said outer element; a bucket wheel mounted coaxially with said shaft to be independently rotatable relatively thereto and independently of said outer element with the beveled end surface of said inner element extending into said wheel, said wheel having an inwardly opening annular channel of greater circumference than the larger end of the flaring surface of said outer element and greater than the peripheral circumference of said inner element, the channel of said wheel having a circular series of bucket members therein; an annular flange on said wheel having an inner impact surface flaring into the channel of said wheel with the smaller portion of this impact surface of greater circumference than and adjacently outward from the larger end of the flaring surface of said outer element, said wheel having a web with openings through it at its other side from its flange; means adapted to rotate said wheel and flange at an operable speed independently of both of said centrifugal elements; a hopper within said wheel adjacent to the beveled end surface of and opening downwardly into the smaller end portion of the flaring surface of said inner element, a stationary channel-shaped collector ring covering the openings through the web of said wheel at the outside thereof to receive the finer portions of material which have been acted upon; and an outlet conduit connected with the lower portion of said ring.

5. In a centrifugal crushing machine, in combination, an annularly flaring annular outer centrifugal element adapted to carry material towards its larger end from which such material is centrifugally impelled in an annular stream, an annularly flaring annular inner centrifugal element with its larger end portion telescoping into the larger end portion of the outer centrifugal element and adapted to carry material towards its larger end from which such material is centrifugally impelled in an annular stream into impingement with material carried by said outer centrifugal element, an annular revolving impact member positioned to have an inner impact surface against which centrifugally impelled material from said outer centrifugal element impinges in an annular stream and from which such impinged material is deflected, means adapted to transfer such deflected material into the smaller end portion of said inner centrifugal element, means adapted to remove the finer portions of material which has been acted upon, means adapted to feed fresh material to be acted upon into the smaller end portion of said outer centrifugal element, means adapted to revolve said annular impact member, and means adapted to rotate said outer and inner centrifugal elements each independently of the other in either direction individually at any desired independent speed including the rotation of said outer centrifugal element in either direction relatively to the direction of revolution of said annular impact member.

6. In a centrifugal crushing machine, in combination, an annular outer centrifugal element mounted to have a horizontal axis and having an inner annularly flaring surface adapted to carry material towards its larger end from which such material is centrifugally impelled in an annular stream, an annular inner centrifugal element coaxial with said outer centrifugal element and having an inner annularly flaring surface the larger end of which telescopically enters part way into the larger end portion of the inner flaring surface of said outer centrifugal element and adapted to carry material towards its larger end from which such material is centrifugally impelled into impingement with material carried by the inner flaring surface of said outer centrifugal element, an annular impact member coaxial with said centrifugal elements and having an inner impact surface outward from the larger end of the inner flaring surface of said outer centrifugal element and against which centrifugally impelled material from said outer centrifugal element impinges in an annular stream and from which such impinged material is deflected away from said outer centrifugal element, a bucket wheel coaxial with said centrifugal elements and which receives therein material deflected by said impact member, a hopper within the bucket wheel adapted to receive material therefrom and direct it into the smaller end portion of the flaring inner surface of said inner centrifugal element, a conduit through which fresh material to be acted upon may be fed into the smaller end portion of the inner flaring surface of said outer centrifugal element, and an outlet conduit through which the finer portions of material may be removed communicating with the interior of said bucket wheel.

7. In a centrifugal crushing machine, in combination, a rotatable centrifugal element having an annularly flaring inner surface adapted to hold a layer of material to be crushed at such an angle that additional material fed into it will be carried towards the larger end of said element and from which such material is centrifugally impelled in an annular stream, an annular revolving impact member positioned to have an inner impact surface against which centrifugally impelled material from said centrifugal element impinges in an annular stream and from which such impinged material is deflected, a rotatable bucket wheel element adapted to receive this deflected material, means including a chute within the bucket wheel adapted to receive material therefrom and divert it into a smaller portion of the flaring inner surface of said centrifugal element, a conduit through which fresh material to be acted upon may be fed into one of said rotatable elements, and an outlet conduit communicating with the inner portion of said bucket wheel through which the finer portions of material may be removed.

8. In a centrifugal crushing machine, in combination, an annularly flaring outer centrifugal element adapted to hold some material in centrifugal repose therein and to carry other material towards its larger end from which such material is centrifugally impelled in an annular stream, an annularly flaring annular inner centrifugal element open at both of its ends with its larger end portion telescoping into the larger end portion of the outer centrifugal element and adapted to carry material towards its larger end from which such material is centrifugally impelled in an annular stream into impingement with material carried in centrifugal repose by said outer centrifugal element, and means embodied in said machine adapted to transfer material impelled from the larger end of said outer centrifugal element into the smaller end portion of said inner centrifugal element through its smaller open end.

9. In a centrifugal crushing machine, in combination, an annularly flaring centrifugal element open at both ends and adapted to carry material towards its larger end from which such material is centrifugally impelled in an annular stream, and means including a rotatable bucket wheel coaxial with said centrifugal element adapted to transfer material impelled from the larger end of said centrifugal element into a smaller portion of said centrifugal element through its smaller open end.

10. In a centrifugal crushing machine, in combination, an annularly flaring rotatable centrifugal element open at both ends and adapted to carry material towards its larger end from which such material is centrifugally impelled in an annular stream, means including a rotatable bucket wheel element coaxial with said centrifugal element adapted to transfer material impelled from the larger end of said centrifugal element into a smaller portion of said centrifugal element through its smaller open end, means adapted to remove from within the machine the finer portions only of material which has been acted upon, and means adapted to feed fresh material to be acted upon into one of said rotatable elements.

11. In an attrition mill, the combination of a horizontally disposed bowl-like receptacle having its open end disposed in a vertical plane and adapted to receive an agglomerate of loose lumpy material and throw it from its open end by centrifugal force, an inclined stationary chute for directing an agglomerate into the open end of said bowl-like receptacle, and means disposed adjacent the open end of said bowl-like receptacle for intercepting the agglomerate thrown therefrom and directing it back into said chute.

12. In an attrition mill, the combination of a bowl-like rotor having an open end for receiving an agglomerate of loose lumpy material and throwing it by centrifugal force, means for feeding an agglomerate into the open end of said rotor, an impact member disposed in the path of the agglomerate thrown out by centrifugal force from said rotor upon which the thrown agglomerate will be broken up by impact, a rotating housing surrounding said bowl-like rotor and said impact member, and means carried by said rotating housing for returning the unreduced particles of the agglomerate to said feeding means, whereby the unreduced agglomerate will be continuously operated upon until reduced to the required fineness.

13. In an attrition mill, the combination of a rotatable drum, an open ended centrifugal rotor adapted to receive an agglomerate of loose lumpy material and throw it from its open end by centrifugal force within said drum, means for continuously feeding an agglomerate into the open end of said centrifugal rotor, an impact member disposed adjacent the open end of said rotor and in the path of the agglomerate thrown out by centrifugal force therefrom, and means within said drum for returning the unreduced particles of the agglomerate to said feeding means, whereby the agglomerate will be continuously operated upon until reduced to the required fineness.

14. In an attrition mill, the combination of an open ended bowl-like rotor element adapted to receive an agglomerate of loose lumpy material to be reduced and throw it outwardly through its open end by centrifugal force, an impact member surrounding the open end of said rotor element against which the centrifugally thrown agglomerate will strike, a feeding chute for directing the agglomerate into the open end of said rotor element, means for returning the unreduced agglomerate to said feeding chute, and flotation means including a circulation of water for continuously removing the reduced agglomerate from the mill.

15. In a wet process attrition mill, the combination of a centrifugally operating agglomerate pulverizing means, a horizontally disposed drum forming a housing surrounding said pulverizing means adapted to collect the reduced and unreduced agglomerate discharged from said pulverizing means, a support for said drum whereby it may be continuously rotated while said mill is in operation, said drum having scoop forming projections located upon its interior surface and disposed so as to pick up the larger particles of the agglomerate in the bottom of said drum and discharge them into the centrifugally operating pulverizing means when the scoop forming projections reach their uppermost position within the drum, said drum also having a centrally disposed opening at one end through which the pulverized agglomerate may be discharged, and means for introducing a circulation of water through said drum to carry away in suspension and/or by flotation the finer particles of the agglomerate discharged by the mill.

16. In a reducing mill, the combination of an open-ended bowl-like element adapted to rotate at high speed and throw agglomerate by centrifugal force, an impact member adjacent the open end of said bowl-like element against which the centrifugally thrown agglomerate will strike, a rotatable drum-like housing for receiving the agglomerate discharged from said impact member, hopper means disposed within said rotatable housing having a discharge outlet for directing agglomerate to be reduced into said open-ended bowl-like element while said element is in rotation, a plurality of buckets disposed about the inner peripheral surface of said housing for picking up the unreduced agglomerate discharged into said housing, means providing a circulation of fluid through the lower part of said drum-like housing and over said buckets adapted to separate the reduced from the unreduced agglomerate and discharge same from said housing, and means for rotating said drum-like housing whereby the buckets disposed therein will return the unreduced agglomerate to said hopper means for further reduction.

PHILIP B. BUCKY.